(12) United States Patent
Wakita et al.

(10) Patent No.: US 6,389,869 B1
(45) Date of Patent: May 21, 2002

(54) PRESSING METHOD FOR FRAME PLATE TO BE MOUNTED WITH DISK DRIVE MOTOR

(75) Inventors: Maki Wakita; Katsutoshi Mukaijima; Shoji Takahashi; Yoshinori Katsumata, all of Tanashi (JP)

(73) Assignees: Citizen Watch Co., Ltd.; Kabushiki Kaisha Katsumata Hatsujyo Seisakusho, both of Tokyo (JP)

( * ) Notice: Subject to any disclaimer, the term of this patent is extended or adjusted under 35 U.S.C. 154(b) by 0 days.

(21) Appl. No.: 09/673,627
(22) PCT Filed: Feb. 14, 2000
(86) PCT No.: PCT/JP00/00796
§ 371 Date: Oct. 19, 2000
§ 102(e) Date: Oct. 19, 2000
(87) PCT Pub. No.: WO00/49620
PCT Pub. Date: Aug. 24, 2000

(30) Foreign Application Priority Data

Feb. 19, 1999 (JP) .......................................... 11-040735

(51) Int. Cl.[7] .............................................. B21D 53/00
(52) U.S. Cl. ..................................................... 72/379.2
(58) Field of Search ....................... 72/333, 335, 379.2, 72/348

(56) References Cited

U.S. PATENT DOCUMENTS

| 4,741,194 A | * | 5/1988 | Kozyra et al. ............. 72/379.2 |
| 5,649,442 A | | 7/1997 | Yoshikawa et al. |
| 5,765,275 A | | 6/1998 | Obara |
| 5,950,483 A | * | 9/1999 | Schneider et al. ......... 72/379.2 |
| 6,082,166 A | * | 7/2000 | Marin .......................... 72/348 |

FOREIGN PATENT DOCUMENTS

| JP | 2-137620 | * | 5/1990 | ................ 72/379.2 |
| JP | 8-153386 | | 6/1996 | |
| JP | 9-120669 | | 5/1997 | |

* cited by examiner

*Primary Examiner*—Lowell A. Larson
(74) *Attorney, Agent, or Firm*—Smith, Gambrell & Russell, LLP

(57) ABSTRACT

In a card-type magnetic recording device (1), a motor (10) for driving a magnetic disk stored therein is mounted in a recess (9) that is formed in a frame plate (8). In order to form the recess (9) in the frame plate (8), backward extrusion molding is effected by means of a die (35) having a slope (39) and a punch (37) having a slope (40). A region between the slope (39) and the slope (40) is crushed by means of the die (35) and the punch (37) that relatively move up and down, and extends backward as well as forward with respect to the moving direction of the punch.

18 Claims, 12 Drawing Sheets

PRESSING METHOD FOR FRAME PLATE TO BE MOUNTED WITH DISK DRIVE MOTOR

TECHNICAL FIELD

The present invention relates to a method for press-molding a frame plate in order to mount a motor for driving a disk, for use as a storage medium, on the frame plate.

BACKGROUND ART

A card-type magnetic recording device is inserted into a slot of a portable computer to add to the functions of the portable computer or increase the capacity of processing data.

A casing of the card-type magnetic recording device is stored with various components, such as a disk-type storage medium, motor for rotating the storage medium, recording/reproducing head element for recording information in or reproducing information from the storage medium, mechanism for ejecting a cartridge stored with the disk from the casing, etc.

The casing of the card-type magnetic recording device is composed of an upper cover, a lower cover, and a side frame.

Further, a circuit board for information processing is pasted on the lower surface of the frame, plate.

In general, the external dimensions of the card-type magnetic recording device constructed in this manner are settled according to the PCMCIA (Personal Computer Memory Card International Association) standards. According to Type II of the PCMCIA standards, which is conventionally used very often, the external dimensions of the card-type magnetic recording device (i.e., external dimensions of the casing) are set so that its width, length, and thickness are 54.0 mm, 85.60 mm, and the 5.0 mm, respectively.

Corresponding to this thinness of the casing, the disk drive motor and the recording/reproducing head element are attached individually to recesses that are formed in one frame plate. As the disk drive motor and the recording/reproducing head element are mounted in the frame plate recesses in this manner, they can be fitted better in a space in the casing that is limited in height (thickness) than in the case where the frame plate is mounted on a flat surface, and the attachment is stabilized.

Usually, a recess and a mounting hole for mounting the disk drive motor on the frame plate and a recess and a mounting hole for mounting the recording/reproducing head element are worked by press-molding a material. Normally, however, the material of the frame plate is a steel sheet or stainless-steel sheet. If the material is press-molded to form the mounting recesses and the mounting holes, therefore, pressing force cannot acts equally, owing to the elasticity of the material, and stress strain remains maldistributed on the press-molded frame plate. Practically, therefore, it is hard to obtain the shapes and dimensions of the mounting recesses and the mounting holes that are in conformity to target values.

DISCLOSURE OF THE INVENTION

The object of the present invention is to provide a press molding method capable of accurately forming a recess and a mounting hole for locating a disk drive motor in a frame plate of an information device that stores a disk-shaped storage medium.

In order to achieve the above object, according to the present invention, a frame plate to be mounted with a disk drive motor is obtained by press molding in a manner such that a circular region is set on the frame plate, a motor mounting hole for mounting the disk drive motor is formed in the central portion of the circular region by punching, a recess with a circular cross section is formed by depressing the circular region in the direction of the cross section by backward extrusion molding, and a ring-shaped rising wall is formed around the motor mounting hole, the rising wall projecting in the direction of the cross section.

According to the working method of the present invention, the backward extrusion molding is applied to the formation of the recess for mounting the disk drive motor, so that the influence of deformation on various parts of:the material during the molding process is small, and therefore, high-accuracy press molding can be accomplished. Thus, the motor can be mounted with an appropriate posture in a proper position on the frame plate.

Further, the ring-shaped rising wall is formed around the motor mounting hole that is formed in the center of the base of the recess. By doing this, distortion of the recess, e.g., deformation of the recess that may otherwise be caused when coil relief slots are punched in the base of the recess, can be corrected. In consequence, the base that serves as a reference for the attachment of the disk drive motor is flat, sop that the mounting position for the disk drive motor with respect to the frame plate can be settled accurately.

Thus, the press molding method of the present invention is a suitable press molding method for a frame plate of a thin small-sized device of which the external size is strictly standardized, e.g., a card-type magnetic recording device.

BEST MODE FOR CARRYING OUT THE INVENTION

Figure 1:
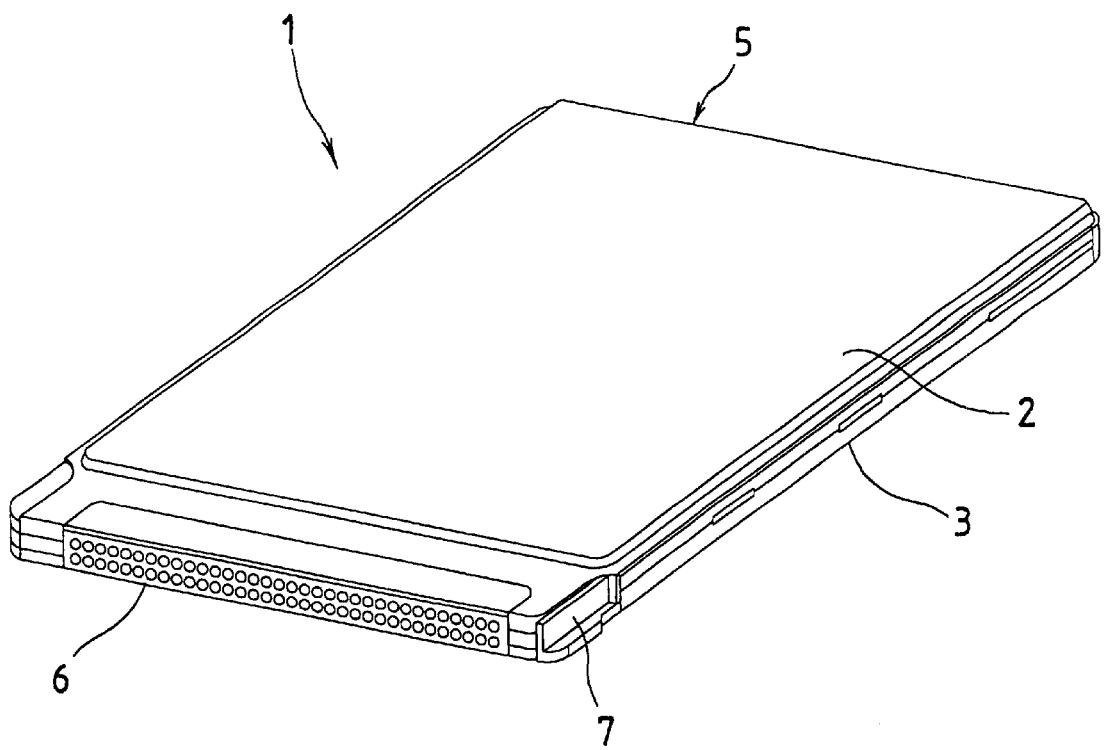
FIG. 1 is a perspective view showing a card-type magnetic recording device in which a frame plate worked by a working method according to the present invention is stored in a casing.

An outline of a card-type magnetic recording device 1, called a PC card, will first be described with reference to the external view of FIG. 1.

This card-type magnetic recording device 1 has external dimensions according to Type II of the PCMCIA standards, and is constructed so that an external connector 6 is provided on the front part of a casing 5. The casing 5 is composed of an upper cover 2, a lower cover 3, and a side frame 7. The casing 5 has therein a space for holding a disk-type storage medium, and is stored with various components (mentioned later) that constitute the magnetic recording device 1. The card-type magnetic recording device 1 is connected to a portable computer (not shown) by means of the external connector 6.

Figure 2:
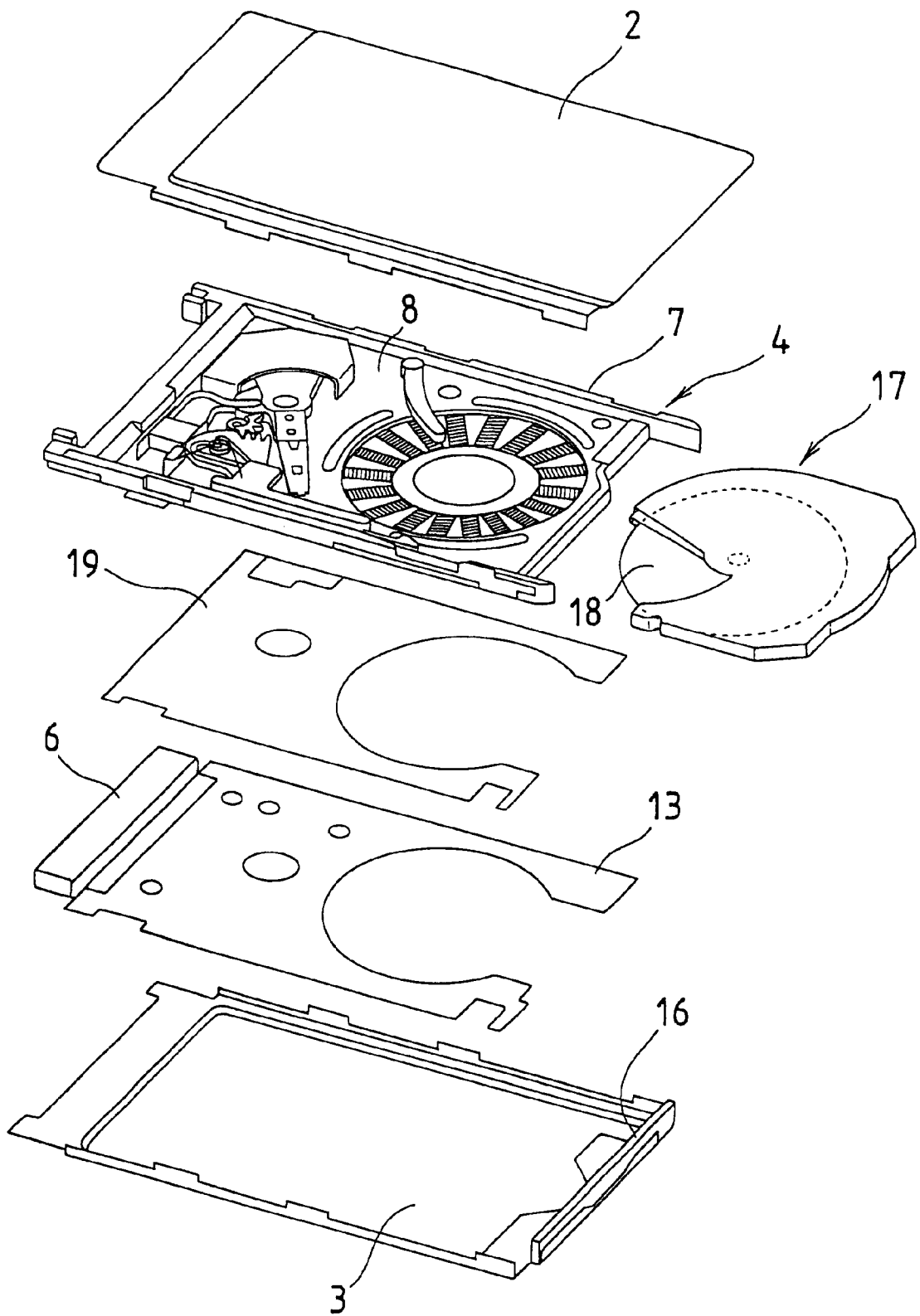
FIG. 2 is an exploded perspective view showing various components in the card-type magnetic recording device of FIG. 1 in a disassembled state.

The card-type magnetic recording device 1 of FIG. 1 will now be described further in detail with reference to the exploded perspective view of FIG. 2.

The upper cover 2 and the lower cover 3 are press-molded pieces of a thin SUS sheet, and the side frame 7 (front frame, rear frame, left-hand frame, and right-hand frame) is formed of a synthetic resin. A frame plate 8 of a stainless-steel sheet is formed integrally with the synthetic-resin side frame 7 by outsert molding.

A space for holding a cartridge 17 that is stored with the magnetic recording disk is formed between the upper cover 2 and the frame plate 8.

A motor for driving a disk 18, a recording/reproducing head element for recording information in or reproducing information from the disk 18, a mechanism for ejecting the cartridge 17 from the casing 5, and the like are mounted on the upper surface of the frame plate 8.

A circuit board 13 is attached to the underside of the frame plate 8 with an insulating film 19 between them. The circuit board 13 is formed with a control circuit for driving a disk drive motor 10 (see FIG. 4) and a recording/reproducing head element 12 mounted on the upper surface of the frame plate 8, and a data processing circuit for reading and writing data through the recording/reproducing head element 12. The external connector 6 is connected to the front part of the circuit board 13.

A shutter 16, which is provided on the rear end edge of the lower cover 3, tilts forward when the cartridge 17 advances into the casing 5.

The form of the frame plate 8 will now be described with reference to FIG. 3.

The rear part of frame plate 8 is formed having a large recess 9 with a circular cross section in which the disk drive motor 10 (see FIG. 4) is to be located. On the other hand, the front part of the frame plate 8 is formed having a small recess 11 with a circular cross section in which the recording/reproducing head element 12 (FIG. 4) is to be located.

A motor mounting hole 24 for fixing the shaft of the disk drive motor 10 is formed in the :central portion of a base 33 of the recess 9 in which the motor 10 is to be located. The motor mounting hole 24 is surrounded by a rising wall 53. Further, slots (coil relief holes) 52, which are as many as stator coils 20 (FIG. 4) of the motor 10 (or eighteen in number) and serve to receive the coils, are formed extending radially around the rising wall 53. Corresponding to the intermediate positions between the coil relief holes 52, eighteen distortion absorbing holes 28 are formed in the peripheral wall of the recess 9.

Further, arcuate ridges 49 are formed in three positions on the frame plate 8, extending along the outer peripheral portion of the recess 9.

Figure 3:
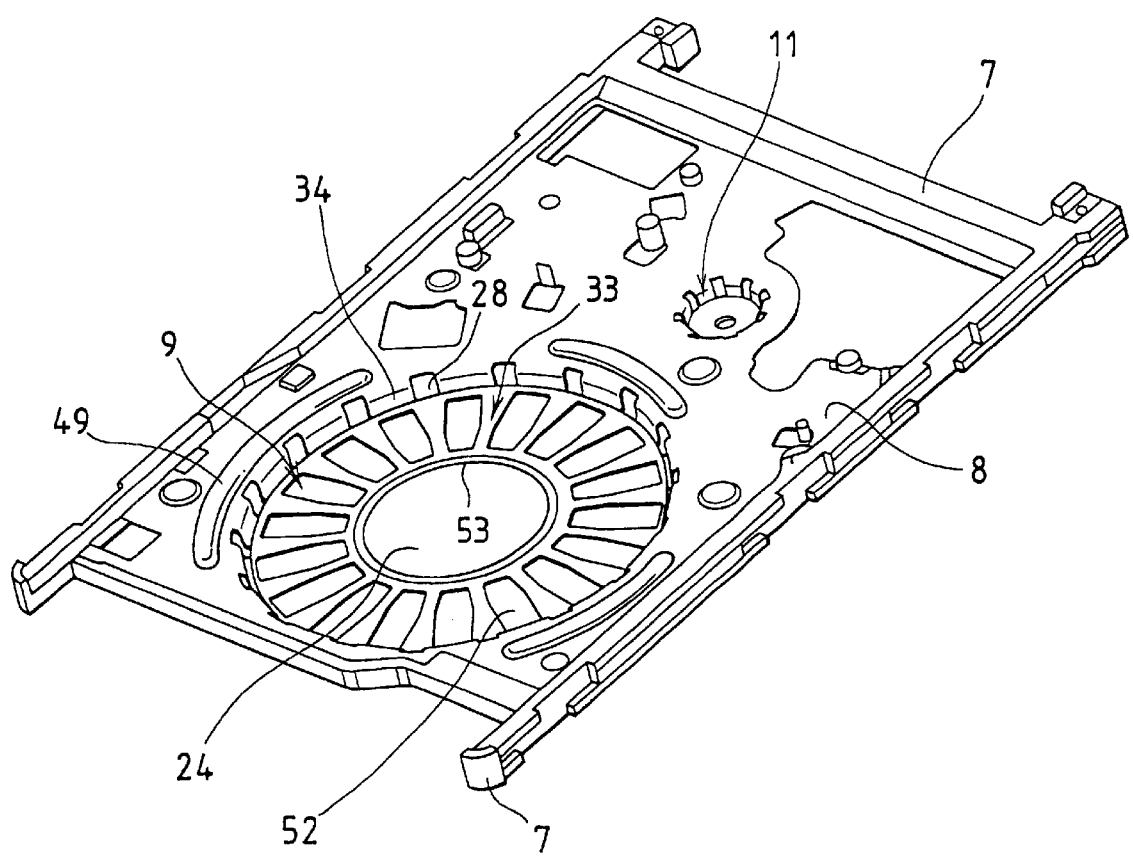
FIG. 3 is a perspective view showing a side frame of the card-type magnetic recording device of FIG. 1 and the frame plate integral with the side frame.
Figure 4:
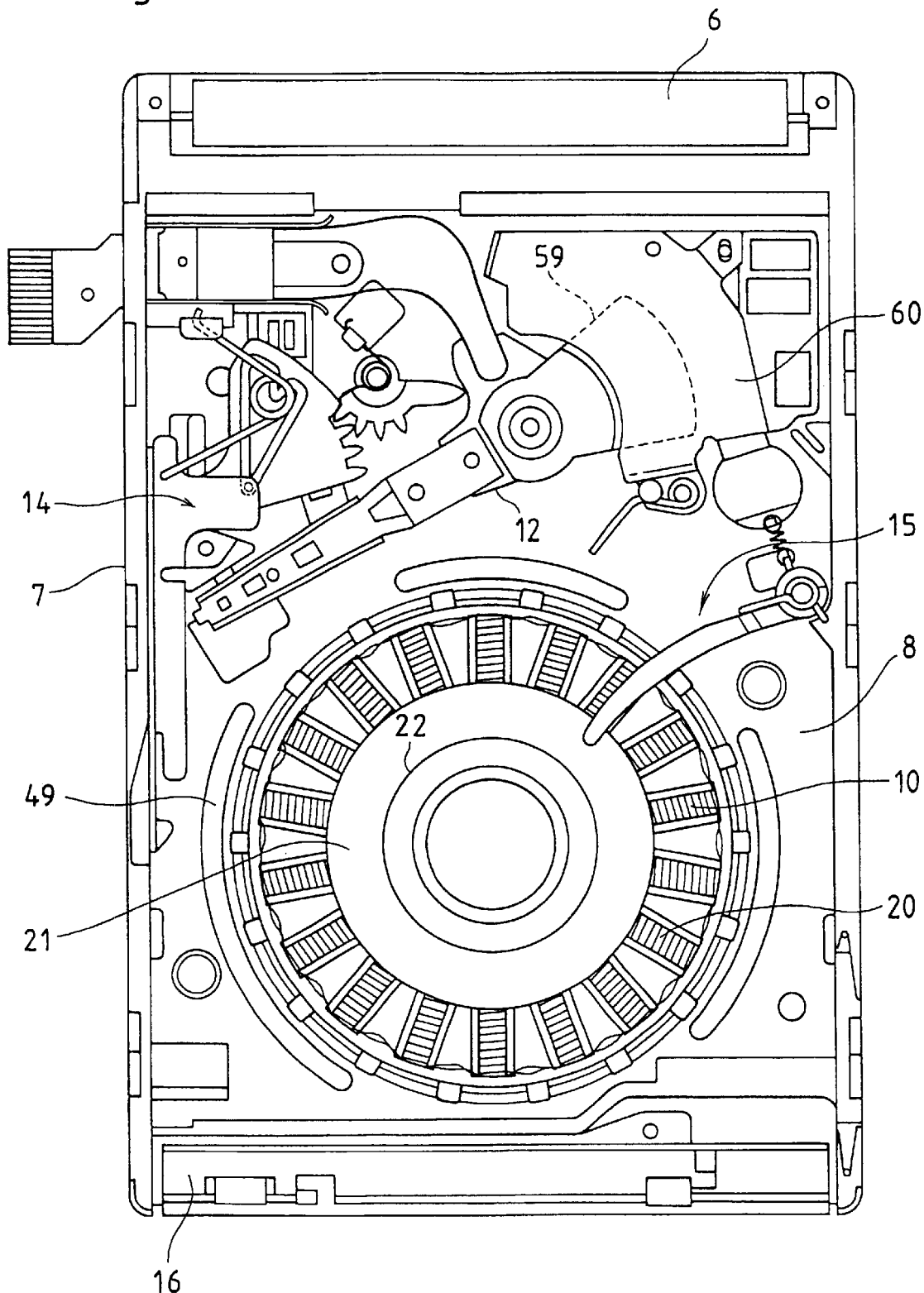
FIG. 4 is a plan view showing a layout of components mounted on the frame plate with an upper cover of the card-type magnetic recording device of FIG. 1 off.

Referring now to FIG. 4, there will be described a state in which the various elements of the card-type magnetic recording device 1, including the disk drive motor 10, recording/reproducing head element 12, etc., are mounted on the frame shown in FIG. 3.

The disk drive motor 10 is attached to the recess 9 (FIG. 3) that is formed in the rear part :of the frame plate 8. The rotating shaft of the recording/reproducing head element 12 is supported by means of the recess 11 (FIG. 3)1 that is formed in the front part of the frame plate 8. Further, the frame plate 8 carries thereon a main eject mechanism 14 and a sub-eject mechanism 15, which are mechanisms for ejecting the cartridge 17 (FIG. 2) from the casing 5.

The disk drive motor 10, which is a thin flat structure, has eighteen radial stator coils 20 and a rotor 21 rotatable in its central portion. The rotor 21 has a ring magnet 22 on its upper surface, to which the hub of the magnetic recording disk 18 in the cartridge 17 is magnetically attracted when the cartridge 17 is inserted into the card-type magnetic recording device 1.

A drive unit for the recording/reproducing head element 12 is composed of yokes 60, a driving coil 59 interposed between the yokes 60, a stator magnet (not shown), etc.

Figure 5:
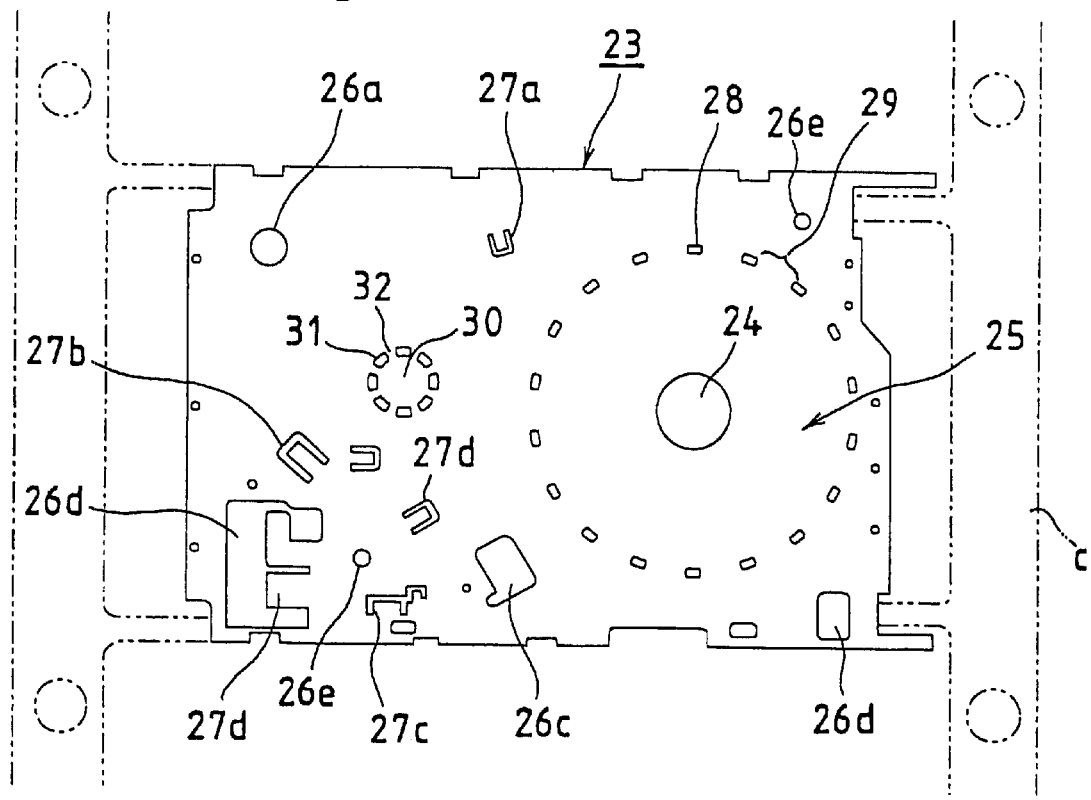
FIG. 5 is a plan view of a stamped sheet (sheet piece to be worked into the frame plate) in a first process for working the frame plate according to the present invention.

Referring now to FIGS. 5 to 16, there will be described steps of procedure for working the frame plate 8 in the form shown in FIG. 3, in which an external shape is stamped out from a flat sheet of stainless steel (SUS304, 0.4 mm thick) and a stamped sheet 23 thus obtained is subjected to press molding and punching. Although this working process may be based on a sequential-feed system (chain lines in FIG. 5 represent a carrier for sequential feed) in which a rolled sheet of SUS is rewound as it is completed by sequential feed and a single-action system in which stamped sheets, called blanks, are worked individually, the working methods have no substantial differences.

[First Process] . . . FIG. 5

A circular region 25 for forming the recess 9 for mounting the disk drive motor 10 is set in a position on the stamped sheet 23 on the rear side (right-hand side in FIG. 5) of its center. The motor mounting hole 24 is punched out in the central portion of the circular region 25. The motor mounting hole 24 serves to receive and fix the shaft portion of the disk drive motor 10. In this process, the hole 24 is a roughly punched hole that has a radius about 0.2 mm smaller than a designed dimension and leaves a finish allowance for fine punching in a subsequent process (fifth process mentioned later).

Further, the eighteen distortion absorbing holes 28 (as many as the stator coils 20 of the disk drive motor 10) are formed at equal spaces in the circumferential direction along the boundary (circle) of the circular region 25 on the stamped sheet 23. A region between each two adjacent distortion absorbing holes 28 serves as a bridge portion 29 for backward extrusion in a process of press molding mentioned later.

In this process, the formation of the distortion absorbing holes 28 may be carried out simultaneously with the formation (rough punching) of the motor mounting hole 24.

A circular region 30 for forming the recess 11 for mounting the rotating shaft of the recording/reproducing head element 12 is set in a position on the stamped sheet 23 on the front side of its center. Further, eight distortion absorbing holes 31 are formed at equal spaces in the circumferential direction along the boundary (circle) of the circular region 230 on the stamped sheet 23. A region between each two adjacent distortion absorbing holes 31 serves as a bridge portion 32 in the process of press molding mentioned later.

Further, the stamped sheet 23 is formed with apertures 26a, 26b, 26c and 26d for mounting various small components, holes 26e through which positioning pins used in each process pass, individually, and punched portions 27a, 27b, 27c and 27d for the formation of raised portions. The apertures 26a to 26d, holes 26e, and punched portions 27a to 27d are formed before the motor mounting hole 24 is roughly punched.

A member represented by chain lines c is a carrier of the stamped sheet 23.

Figure 6:
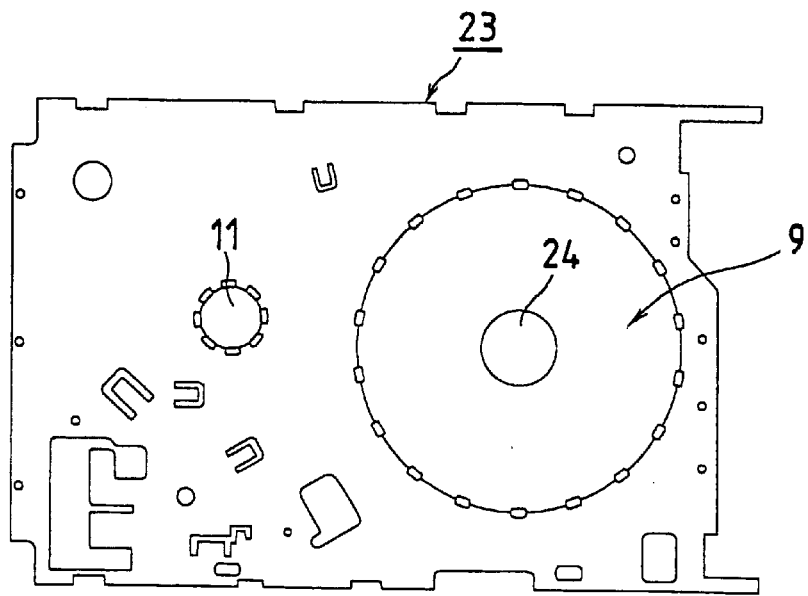
FIG. 6 is a plan view of the stamped sheet in second and third processes for working the frame plate according to the present invention.

[Second Process] . . . FIG. 6

The recesses 9 and 11 are formed by press-molding the circular regions 25 and 30 set on the stamped sheet 23 by means of a press tool for backward extrusion that includes a die 35 and a punch 37. This press molding will be described with reference to FIG. 11.

The stamped sheet 23 is placed on the upper surface of the die 35, and moreover, the upper surface of the stamped sheet 23 is pressed by means of a stripper 36. That region of the stamped sheet 23 which is expected to form the base of the recess 9 or 11 is pushed in downward (in the direction indicated by arrow A in FIG. 11) with respect to the die 35 in a manner such that it is held between the punch 37 and a knockout punch 38.

Figure 11:
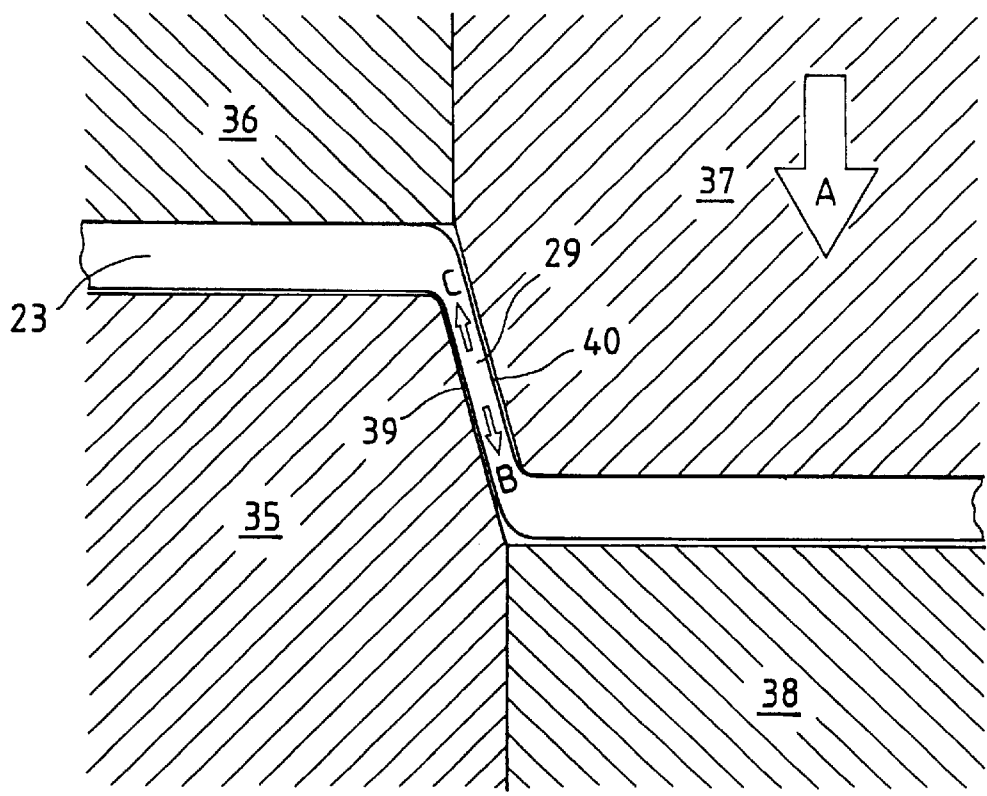
FIG. 11 is a view for illustrating the way of working the frame plate used in the second process for working the frame plate according to the present invention.

As shown in FIG. 11, the respective opposed side faces of the die 35 and the punch 37 are slopes (i.e., shoulder portions 39 and 40), not vertical surfaces. If the punch 37 is pushed in the direction indicated by arrow A in FIG. 11 with respect to the die 35, therefore, the bridge portions 29 between the distortion absorbing holes 28 or the bridge portions 32 between the distortion absorbing holes 31 of the stamped sheet 23 are crushed between the shoulder portion 39 of the die 35 and the shoulder portion 40 of the punch 37 and subjected to backward extruding action. The bridge portions 29 or 32 of the stamped sheet 23 crushed by the shoulder portions 39 and 40 extend in the direction of arrow B of FIG. 11 and the direction of arrow C opposite to it (in the moving direction of the punch 37 and its opposite direction) and form the peripheral wall of the recess 9 or 11.

As the bridge portions 29 or 32 are crushed by the relative movement of the shoulder portions 39 and 40, the distortion absorbing holes 28 or 31 extend in the directions of arrows C and D (i.e., in the depth direction of the recess 9 or 11) and are deformed.

If conventional drawing is carried out without using the press tool for backward extrusion shown in FIG. 11, the bridge portions 29 are liable to break, or the material around the recess 9 is easily withdrawn to change the blank shape lopsidedly. However, the occurrence of such a situation can be restrained if the aforesaid press tool for backward extrusion is used for working.

If the press molding for backward extrusion is applied in this manner, the circular regions 25 and 30 set on the stamped sheet 23 are depressed in the direction of its cross section by the aforesaid press molding. Deformation that is caused by this depression is compensated as the material is stretched by the press molding, so that the areas around the circular regions 25 and 30 of the frame plate of the stamped sheet 23 undergo no deformation during molding operation. This press molding is performed within a limited volume and is finished in one process.

When the recess 9 or 11 is formed in the stamped sheet 23 by the press molding using the die 35 and the punch 37 shown in FIG. 11, its depth is made 0.1 to 0.2 mm greater than its final dimension in consideration of the subsequent processes.

[Third Process] . . . FIG. 6

Figure 12:
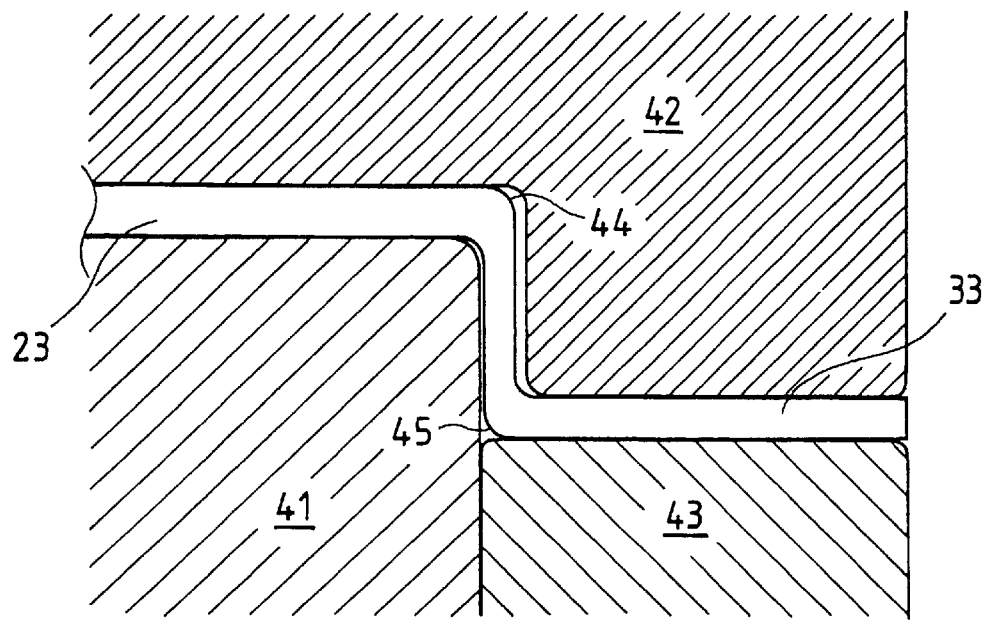
FIG. 12 is a view for illustrating the way of working the frame plate used in the third process for working the frame plate according to the present invention.
Figure 13:
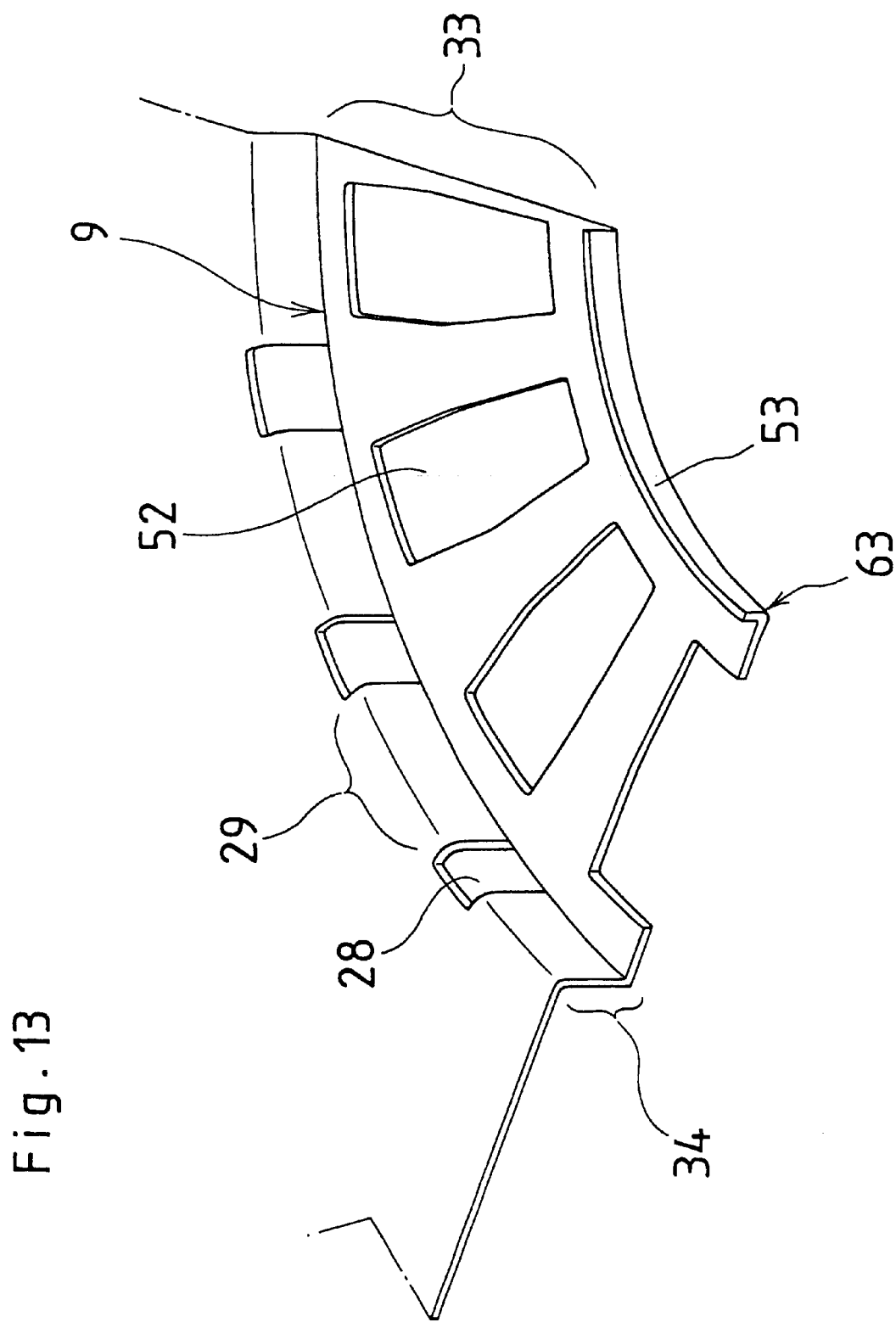
FIG. 13 is a partial view of the frame plate worked by the method according to the present invention.

After the recess 9 or 11 is, formed in the stamped sheet 23 by the press molding using the die .35 and the punch 37 shown in FIG. 11, the form of the recess 9 or 11 is rearranged by press molding using a die 41, stripper 42, and knockout punch 43 shown in FIG. 12.

In this press molding shown in FIG. 12, the stamped sheet 23 is placed on the die that has no slope (shoulder portion), and its top is held down by means of the stripper 42 that has no slope (shoulder portion). Then, the stamped sheet 23 is pressed by lifting the knockout punch 43 that is placed on the underside of the bottom 33 of the recess 9 or the base of the recess 11 (i.e., by moving it toward the stripper). In consequence, the recess 9 or the recess 11 is formed having a vertical peripheral wall. The vertical peripheral wall of the recess 9 or 11 is provided with the distortion absorbing holes 28 or 31 that extend deformed in the depth direction.

The recess 9 or the recess 11, which is formed by subjecting the stamped sheet 23 to the press molding using the die 35 and the punch 37 shown in FIG. 11 (second process) and then subjecting it to the press molding using the die 41 and the knockout punch 43 shown in FIG. 12 (third process), is a high-precision recess having corner portions 44 and 45 that bend at right angles.

Figure 7:
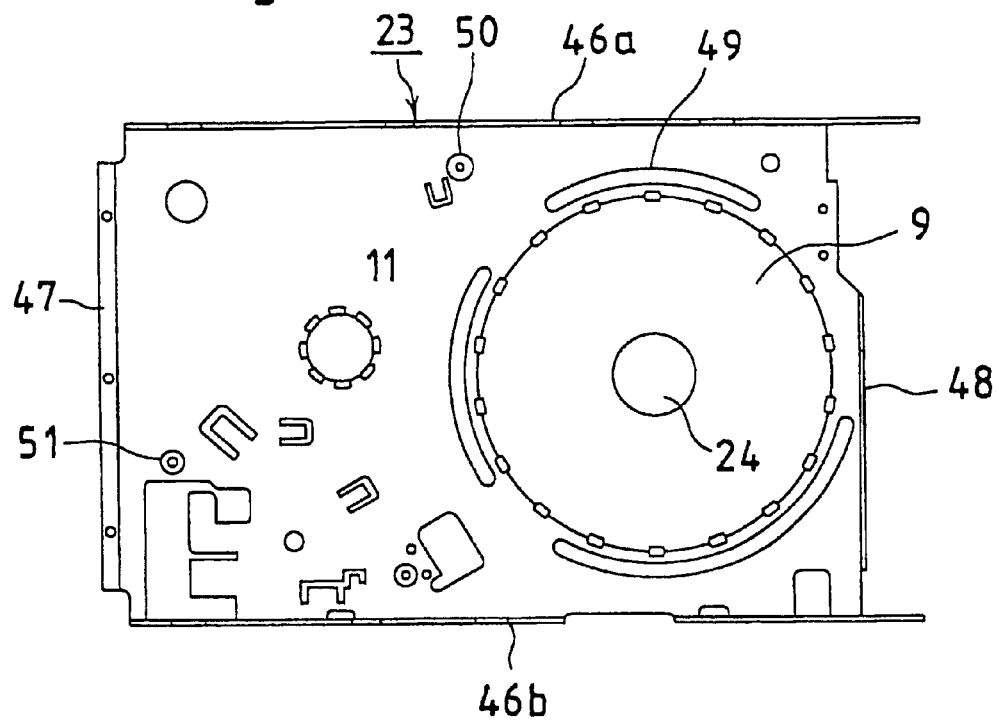
FIG. 7 is a plan view of the stamped sheet in a fourth process for working the frame plate according to the present invention.

[Fourth Process] . . . FIG. 7

Left- and right-hand side walls 46a and 46b of the stamped sheet 23 is raised. Further, a step portion 47 is formed on the front end of the stamped sheet 23. Furthermore, a raised portion 48 is formed on a part of the rear end of the stamped sheet 23.

Further, three arcuate ridges 49 are arranged around and along the disk drive motor mounting recess 9 of the stamped sheet 23. Furthermore, a portion 50 that serves as a bearing of the subject mechanism 15 (FIG. 4), a spot 51 that serves as a mounting portion for a small component, etc. are formed in given regions on the stamped sheet 23 by burring.

Figure 8:
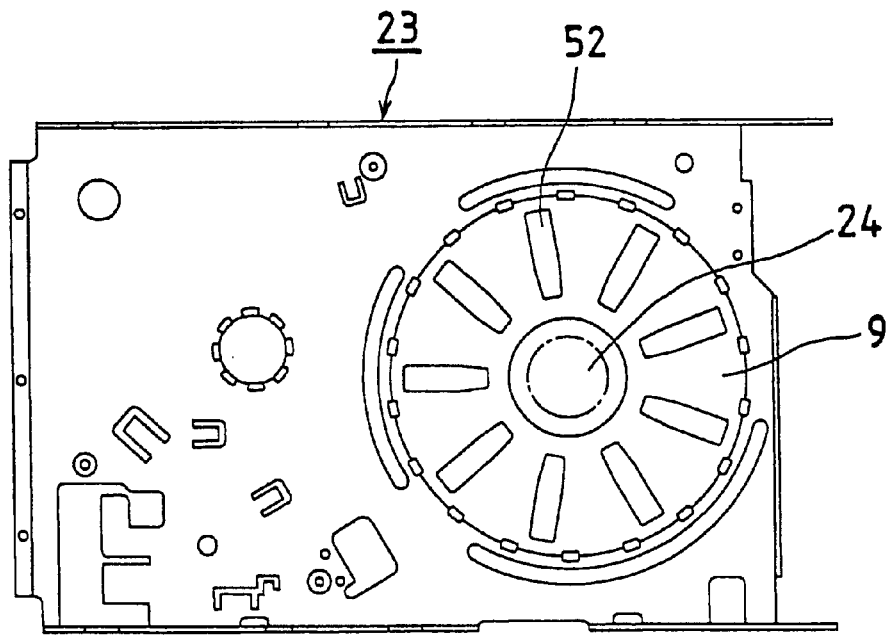
FIG. 8 is a plan view of the stamped sheet in a fifth process for working the frame plate according to the present invention.

[Fifth Process] . . . FIG. 8

Secondary working (fine punching) of the motor mounting hole 24 and first punching of the coil relief slots 52 are carried out.

In the first process, the motor mounting hole 24 (the outline of the hole 24 is represented by two-dot chain line in FIG. 8) is formed by rough punching in the central portion of the circular region 25 of the stamped sheet 23. In the present process, however, finish working (fine punching) is carried out to enlarge the hole 24 to the designed dimension. This fine punching, however, involves a finish allowance (about 0.5 mm) for a subsequent burring finish process.

This fine punching is applied to the bottom 33 of the disk drive motor mounting recess 9. The recess 9 is already formed before the present process is started. Accordingly, causes of distortion, such as knurls remaining on the stamped sheet 23, are already removed when the recess 9 is formed, so that the motor mounting hole 24 can be formed accurately.

Further, the bottom 33 of the recess 9 is subjected to the first punching of the coil relief slots 52. In this first punching, as shown in FIG. 8, only nine slots, half of the eighteen slots to be formed in the end, are formed. Each coil relief slot 52 is located so as to face the point halfway between each corresponding distortion absorbing hole 28 and its adjacent distortion absorbing hole 28 (these holes 28 are already formed in the first process).

In the present process, the fine punching of the motor mounting hole 24 and the punching of the coil relief slots 52 may be carried out simultaneously.

Figure 9:
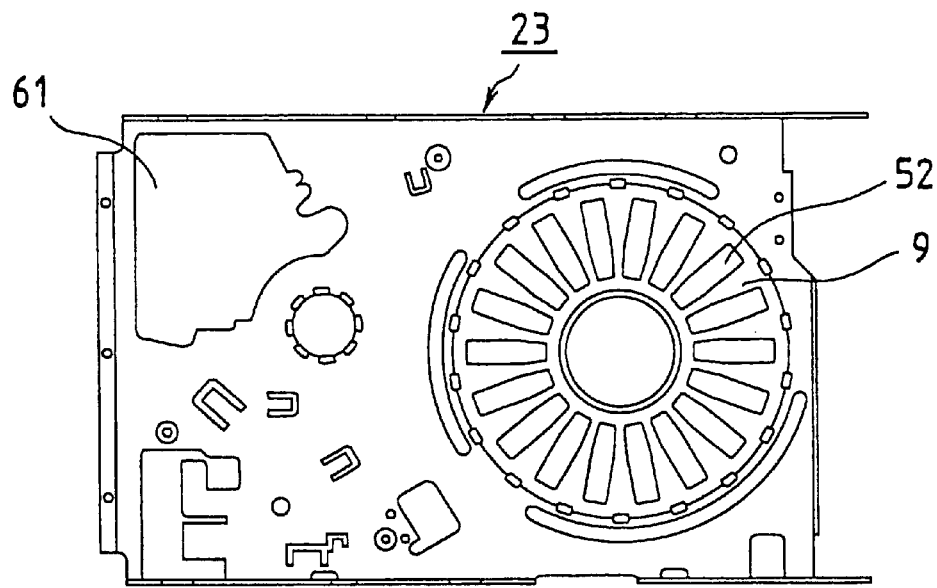
FIG. 9 is a plan view of the stamped sheet in a sixth process for working the frame plate according to the present invention.

[Sixth Process] . . . FIG. 9

In the present process, following the first punching of the coil relief slots 52 in the fifth process, second punching of the remaining nine coil relief slots 52 and other punching operations are carried out.

If the second punching of the coil relief slots 52 is finished, then the eighteen coil relief slots 52 are radially formed at equal spaces in the circumferential direction in the bottom 33 of the disk drive motor mounting recess 9.

As described above, the eighteen slots 52 are punched in two installments of nine without being all punched at a stroke as a piercing die moves, so that the coil relief slots 52 can be formed without requiring a great force at a time. In consequence, according to this working method, as compared with the working method in which the eighteen coil relief slots 52 are punched at a stroke as the piercing die moves, the bottom 33 of the recess 9 is subjected to a smaller shock, so that distortion of the recess 9 that is caused by piercing can be restrained.

In the case of FIGS. 8 and 9, the eighteen coil relief slots 52 are alternately punched in two installments of nine, so that the bottom 33 of the recess 9 cannot be subjected, in these two cycles of punching, to any one-sided force in any direction such that it is deformed. It is to be understood that every third slot may be punched so that the slots are divided in three installments of six.

The eighteen slots 52 formed in the bottom 33 of the recess 9 are not opposed to the eighteen distortion absorbing holes 28 in a peripheral wall 34 (see FIG. 13) of the recess 9, and each faces the point halfway between each corresponding distortion absorbing hole 28 and its adjacent distortion absorbing hole 28. In consequence, that region of the. recess 9 which is located between the distortion absorbing holes 28 and the coil relief slots 52 is not specially narrowed, so that there is no possibility of that region being deformed by an external force.

Besides the coil relief slots 52 punched as aforesaid, a cutout hole 61 is formed in the front part of the stamped sheet 23. The cutout hole 61 can be fitted with the yokes 60 (FIG. 4), which constitute the drive unit for the recording/ reproducing head element 12, and the stator magnet. The yokes 60 and stator magnet should be attached to the cutout hole 61 in this manner because the stamped sheet 23 (which forms the frame plate 8 when worked) is formed of a stainless-steel sheet, a nonmagnetic material, which, though thin, has relatively high stiffness. The yokes 60, molded from a magnetic steel sheet, are attached to the cutout hole 61, and a permanent magnet for use as a stator is located on the yokes 60.

Figure 10:
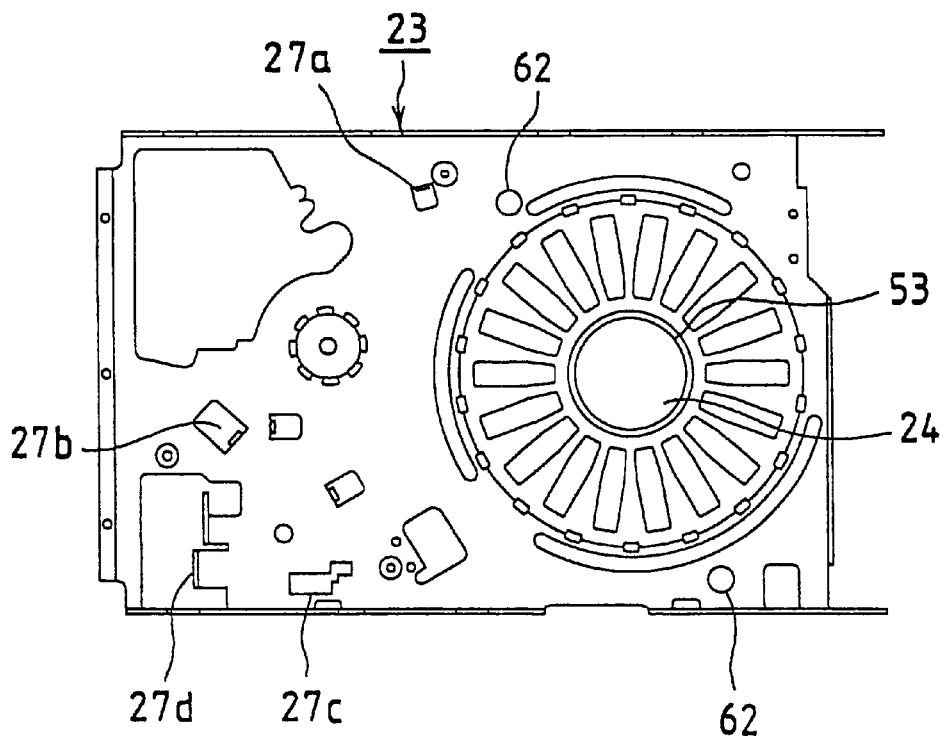
FIG. 10 is a plan view of the stamped sheet in seventh to ninth processes for working the frame plate according to the present invention.

[Seventh Process] . . . FIG. 10

Support projections 62 are formed on the front part of the stamped sheet 23 by supplementary hammering. These support projections 62 serve to support the cartridge 17 that is inserted in the card-type magnetic recording device 1 (FIG. 1) so that the disk drive motor 10 is not damaged when the cartridge 17 is pressed through the upper cover 2.

[Eighth Process] . . . FIG. 10

The punched portions 27*a* to 27*c* (FIG. 5) formed before the first process are raised (bent) to form risers, and a small piece of the punched portion 27*d* is turned (bent) to form a riser.

[Ninth Process] . . . FIG. 10

The rising wall 53 (see FIG. 13) is formed around the motor mounting hole 24 by burring. The rising wall 53 is in the form of a ring, which projects vertically from the plane of the bottom 33 of the disk drive motor mounting recess 9. The burring serves to correct deformation of the recess 9 that may possibly be caused when the coil relief slots 52 are punched out in the preceding processes (fifth and sixth processes) and maintain the corrected form of the recess 9.

Figure 14:
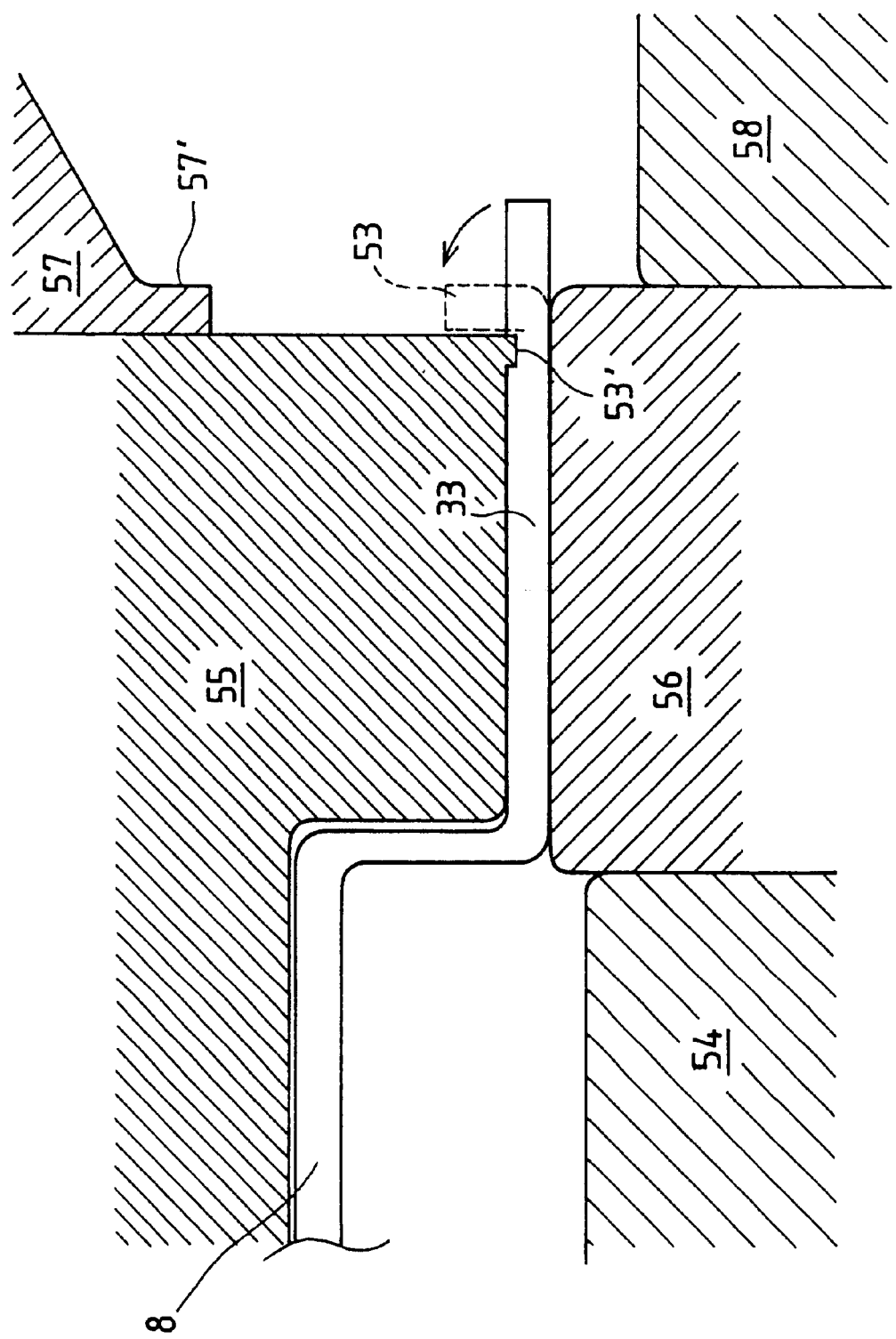
FIG. 14 is a view for illustrating rough bending for a rising wall used in the ninth process for working the frame plate according to the present invention.

The burring will now be described with reference to FIGS. 14 to 16.

The burring is carried out by using a die 54, stripper 55, knockout punch 56, punch 57, and insert die 58. As shown in FIG. 15, a clearance s that is equivalent to the thickness of the bottom 33 of the recess 9 is provided between the stripper 55 and the insert die 58. The punch 57 is provided with an annular protrusion 57 that projects downward. The protrusion 57' has a wall thickness such that it can get into the clearance s between the stripper 55 and the insert die 58.

Figure 15:
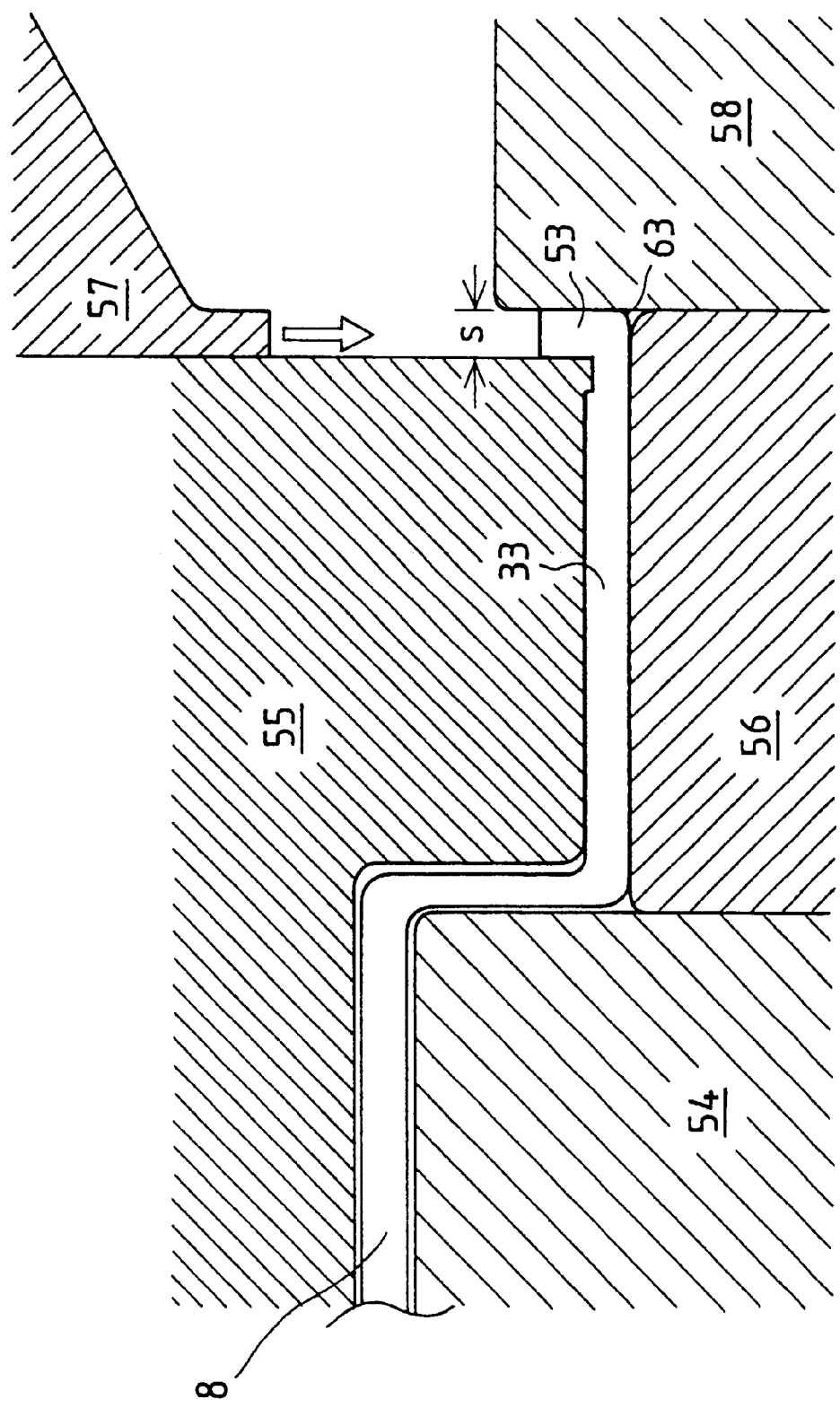
FIG. 15 is a view illustrating a state just before the start of the next process of fine bending after the end of the rough bending of FIG. 14.
Figure 16:
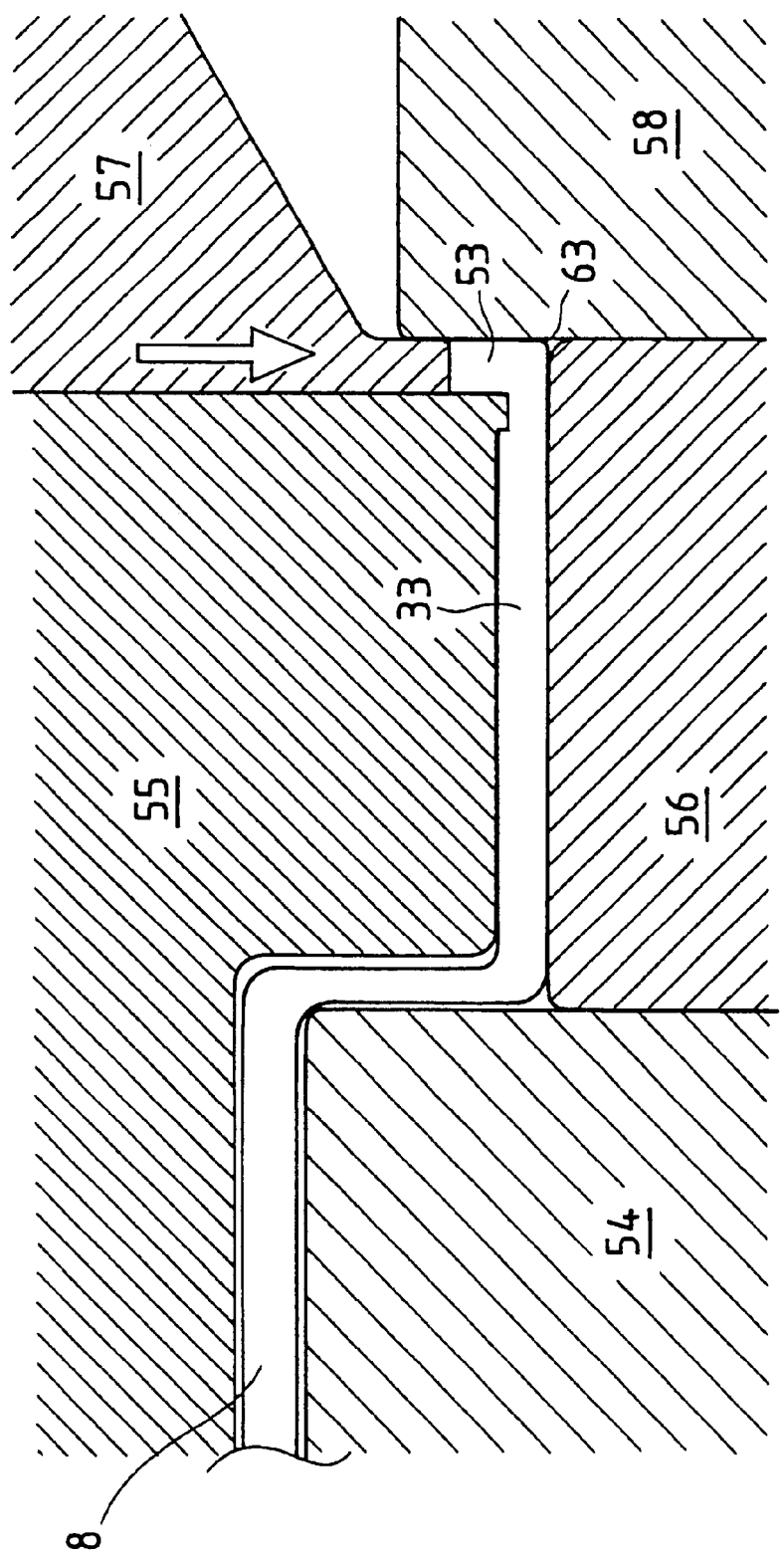
FIG. 16 is a view for illustrating a state at the end of the fine bending for the rising wall used in the ninth process for working the frame plate according to the present invention.

The burring is carried out in two steps, rough bending (FIG. 14) and fine bending (FIGS. 15 and 16). The following is a description of these steps. (1) Rough bending is carried out with the punch 57 shunted above, as shown in FIG. 14. The stamped sheet 23 (i.e., half-molded frame plate 8) is placed on the die 54. The knockout punch 56 is raised so that its upper surface is located above the upper surface of the insert die 58, and at the same time, the stripper 55 is lowered so that the bottom 33 of the recess 9 is held between the knockout punch 56 and the stripper 55.

Then, the knockout punch 56 and the stripper 55 are lowered with the bottom 33 of the recess 9 held between them. Thereupon, as shown in FIG. 14, the peripheral edge portion of the bottom 33 of the recess 9 that surrounds the motor mounting hole 24 abuts against the fixed insert die 58 and is bent vertically upward, thus forming the ring-shaped rising wall 53. This movement of the knockout punch 56 and the stripper 55 with the bottom 33 of the recess 9 between them, with respect to the insert die 58, is repeated about three times. In consequence, the ring-shaped rising wall 53 can be formed steadily on the peripheral edge portion of the bottom 33 of the recess 9 that surrounds the motor mounting hole 24. The rising wall 53 is worked so that its rising height is about 0.2 mm greater than a target value. (2) Fine working is started by lowering the punch 57 toward the end edge of the rising wall 53 held between the stripper 55 and the insert die 58 (in the clearance s) after the rough bending is finished, as shown in FIG. 15.

As the punch 57 is lowered to press the end edge of the rising wall 53 that is held between the stripper 55 and the insert die 58, as shown in FIG. 16, the rising height of the rising wall 53 that is about 0.2 mm greater than the target value is just reduced to the target value.

As a result of the rough bending and the fine bending described above, the ring-shaped rising wall 53 of given dimensions that rises vertically is formed around the motor mounting hole 24 in the bottom 33 of the recess 9.

The bottom 33 of the recess 9 is held between the rising wall 53 and the stripper 55 in the present burring process. If the bottom 33 ceases to be flat in any of the working processes preceding the present process, therefore, it is flattened in this process. Further, the presence of the continuous ring-shaped rising wall 53 on the bottom 33 of the recess 9 keeps the bottom 33 of the recess 9 flat.

The vertical rising wall can be easily formed by the rough bending if a groove 53' with a given width and a given depth is previously formed in that region of the bottom 33 of the recess 9 which corresponds to the root of the ring-shaped rising wall 53 to be formed in the future, before the burring is started.

The rising wall 53 may be worked by any other working method than the aforesaid burring, e.g., by hammering. Further, the rising wall 53 may be formed so as to project downward instead of projecting upward in the manner shown in FIG. 13. If the rising wall 53 is formed projecting downward, however, the overall height of the frame plate becomes equal to the distance from the upper end of the peripheral wall 34 (FIG. 13) of the recess 9 to the lower end of the rising wall 53, which is greater than in the case where the rising wall 53 is formed projecting upward. This is not a desirable factor for the storage in the thin casing 5 that is based on the PCMCIA standards.

The stamped sheet 23 is formed into the frame plate shown in FIG. 3 after undergoing the various processes described above.

The card-type magnetic recording device 1 is assembled substantially in the following manner.

The disk drive motor 10 is attached to the recess 9 of the frame plate 8, and the disk drive motor 10 and the circuit board 13 are connected to each other. The stator coils 20 of the disk drive motor 10 are fitted individually in the coil relief slots 42 that are formed in the recess 9.

The recording/reproducing head element 12 is attached to the recess 11 of the frame plate 8. The driving coil 59 is interposed between the yokes 60 that are fixed to the frame plate 8.

Further, the main eject mechanism 14, sub-eject mechanism 15, and other components are attached to the frame plate 8.

The circuit board 13 is put on and fixed to the underside of the frame plate.

The upper and lower covers 2 and 3 are caused to engage the side frame 7 to form the casing 5.

In this manner, the card-type magnetic recording device 1 is completed in which a socket of the external connector 6 is exposed forward, and which is provided with an aperture (having the shutter 16) for the insertion of the cartridge 17 at the rear end.

Although the card-type magnetic recording device 1 has been described as a device of which the external size is based on Type II of the PCMCIA standards, the press molding method for the frame plate according to the present invention is not limited to these standard and type.

What is claimed is:

1. A press molding method for a frame plate to be mounted with a disk drive motor, comprising:
    setting a circular region on the frame plate;
    forming a motor mounting hole for mounting the disk drive motor in the central portion of said circular region by punching;
    forming a formed circular recess by depressing said circular region by backward extrusion molding; and
    forming a ring-shaped rising wall around said motor mounting hole, said rising wall projecting from said formed recess.

2. A press molding method for a frame plate to be mounted with a disk drive motor according to claim 1, which further comprises forming a plurality of coil relief slots for the location of stator coils in the bottom of said formed recess, said slots being arranged radially at equal spaces around the center of said base.

3. A press molding method for a frame plate to be mounted with a disk drive motor according to claim 2, wherein said plurality of coil relief slots are formed by a plurality of cycles of punching.

4. A press molding method for a frame plate to be mounted with a disk drive motor according to claim 1, wherein the formation of said recess is preceded by forming, by punching, a plurality of distortion absorbing holes at equal spaces in the circumferential direction along the boundary of the region to be formed with said recess so that regions between the adjacent distortion absorbing holes serve as bridge portions for backward extrusion.

5. A press molding method for a frame plate to be mounted with a disk drive motor according to claim 4, wherein coil relief slots for locating stator coils are formed in the bottom of said recess and each said distortion absorbing hole is located so as to face the point halfway between each said coil relief slot and a coil relief slot adjacent thereto.

6. A press molding method for a frame plate to be mounted with a disk drive motor according to claim 1, wherein said forming the motor mounting hole by punching includes rough punching for forming a first aperture in the central portion of the circular region and fine punching following the formation of said recess.

7. A press molding method for a frame plate to be mounted with a disk drive motor according to claim 6, wherein said rough punching is carried out simultaneously with punching of distortion absorbing holes.

8. A press molding method for a frame plate to be mounted with a disk drive motor according to claim 6, wherein said recess and said fine punching is carried out simultaneously with punching of coil relief slots.

9. A press molding method for a frame plate to be mounted with a disk drive motor according to claim 1, wherein said ring-shaped rising wall is formed by burring.

10. A press molding method for a frame plate to be mounted with a disk drive motor according to claim 9, wherein said burring includes two steps, rough bending and fine bending.

11. A press molding method for a frame plate to be mounted with a disk drive motor according to claim 9, wherein the direction of bending by said burring is opposite to the direction of depression for the formation of the recess.

12. A press molding method for a frame plate to be mounted with a disk drive motor according to claim 1, wherein a second recess with a circular cross section for the location of a rotating shaft portion of a recording/reproducing head element is formed in said frame plate by backward extrusion molding as said recess is formed.

13. A press molding method for a frame plate to be mounted with a disk drive motor according to claim 1, wherein said backward extrusion molding is carried out by applying press molding using a die and a punch having a slope each to a material sheet for the frame plate.

14. A press molding method for a frame plate to be mounted with a disk drive motor, comprising:
    setting a circular region on the frame plate;
    simultaneously forming a motor mounting hole for mounting the disk drive motor in the central portion of the circular region and distortion absorbing holes on the boundary of the circular region by punching;

forming a circular recess by depressing said circular region by backward extrusion molding;

simultaneously forming a fine motor mounting hole and coil relief slots by punching; and forming a ring-shaped rising wall around said fine motor mounting hole, said rising wall projecting from said recess.

15. A press molding method for a frame plate to be mounted with a disk drive motor according to. claim 14, wherein a second recess with a circular cross section for the location of a rotating shaft portion of a recording/reproducing head element is formed in said frame plate by backward extrusion molding as said recess is formed.

16. A press molding method for a frame plate to be mounted with a disk drive motor according to claim 12 or 15, wherein said second recess with a circular cross section is formed by setting a circular region on said frame plate, forming a plurality of distortion absorbing holes at equal spaces on the boundary of said circular region so that the regions between the adjacent distortion absorbing holes serve as bridge portions for backward extrusion, and depressing the circular region in backward extrusion molding.

17. A press molding method for a frame plate to be mounted with a disk drive motor according to claim 14, wherein said backward extrusion molding is carried out by applying press molding using a die and a punch having a slope each to a material sheet for the frame plate.

18. A press molding method for a frame plate to be mounted with a disk drive motor according to claim 13 or 17, wherein said material sheet is gradually press-molded to complete the frame plate to be mounted with the disk drive motor in a manner such that a rolled sheet is rewound as the sheet is fed sequentially.

* * * * *

UNITED STATES PATENT AND TRADEMARK OFFICE
CERTIFICATE OF CORRECTION

| | | |
|---|---|---|
| PATENT NO. | : 6,389,869 B1 | |
| DATED | : May 21, 2002 | |
| INVENTOR(S) | : Maki Wakita et al. | |

It is certified that error appears in the above-identified patent and that said Letters Patent is hereby corrected as shown below:

<u>Column 10,</u>
Lines 35-38, Claim 8 should read as follows:

-- 8. A press molding method for a frame plate to be mounted with a disk drive motor according to claim 6, wherein said fine punching is carried out simultaneously with punching of coil relief slots. --

Signed and Sealed this

Sixth Day of May, 2003

JAMES E. ROGAN
*Director of the United States Patent and Trademark Office*